(12) United States Patent
Davidson et al.

(10) Patent No.: US 9,477,649 B1
(45) Date of Patent: Oct. 25, 2016

(54) MULTI-LAYER TELESTRATION ON A MULTI-TOUCH DISPLAY DEVICE

(75) Inventors: Philip L. Davidson, New York, NY (US); Jefferson Y. Han, Holliswood, NY (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 1332 days.

(21) Appl. No.: 12/652,632

(22) Filed: Jan. 5, 2010

Related U.S. Application Data

(60) Provisional application No. 61/142,625, filed on Jan. 5, 2009.

(51) Int. Cl.
*G06F 17/24* (2006.01)
*G06F 9/54* (2006.01)
*G06F 3/0488* (2013.01)
*G06K 9/46* (2006.01)

(52) U.S. Cl.
CPC ......... *G06F 17/242* (2013.01); *G06F 3/04883* (2013.01); *G06F 9/54* (2013.01); *G06F 2203/04808* (2013.01); *G06K 9/468* (2013.01)

(58) Field of Classification Search
USPC .......................................... 600/437; 715/702
See application file for complete search history.

(56) References Cited

U.S. PATENT DOCUMENTS

| | | | |
|---|---|---|---|
| 8,370,869 B2* | 2/2013 | Paek | G06F 17/30858 382/162 |
| 2006/0031755 A1* | 2/2006 | Kashi | G06F 17/242 715/201 |
| 2007/0260675 A1* | 11/2007 | Forlines | G06F 9/52 709/203 |
| 2009/0076385 A1* | 3/2009 | Jackson et al. | 600/437 |
| 2010/0023851 A1* | 1/2010 | Schormann | G06Q 10/10 715/232 |
| 2010/0031202 A1* | 2/2010 | Morris | G06F 3/04883 715/863 |

* cited by examiner

*Primary Examiner* — Jeffrey A Gaffin
*Assistant Examiner* — John M Heffington
(74) *Attorney, Agent, or Firm* — Brandon Roper; Judy Yee; Micky Minhas

(57) ABSTRACT

Objects displayed on a display component of a multi-touch display device may be assigned to and displayed at various visual layers, with each visual layer corresponding to a different depth relative to a foreground (or background) of the display component of the multi-touch display device. One or more annotations may be generated in response to user interaction with the multi-touch display device, with each annotation being assigned to an appropriate visual layer.

31 Claims, 10 Drawing Sheets

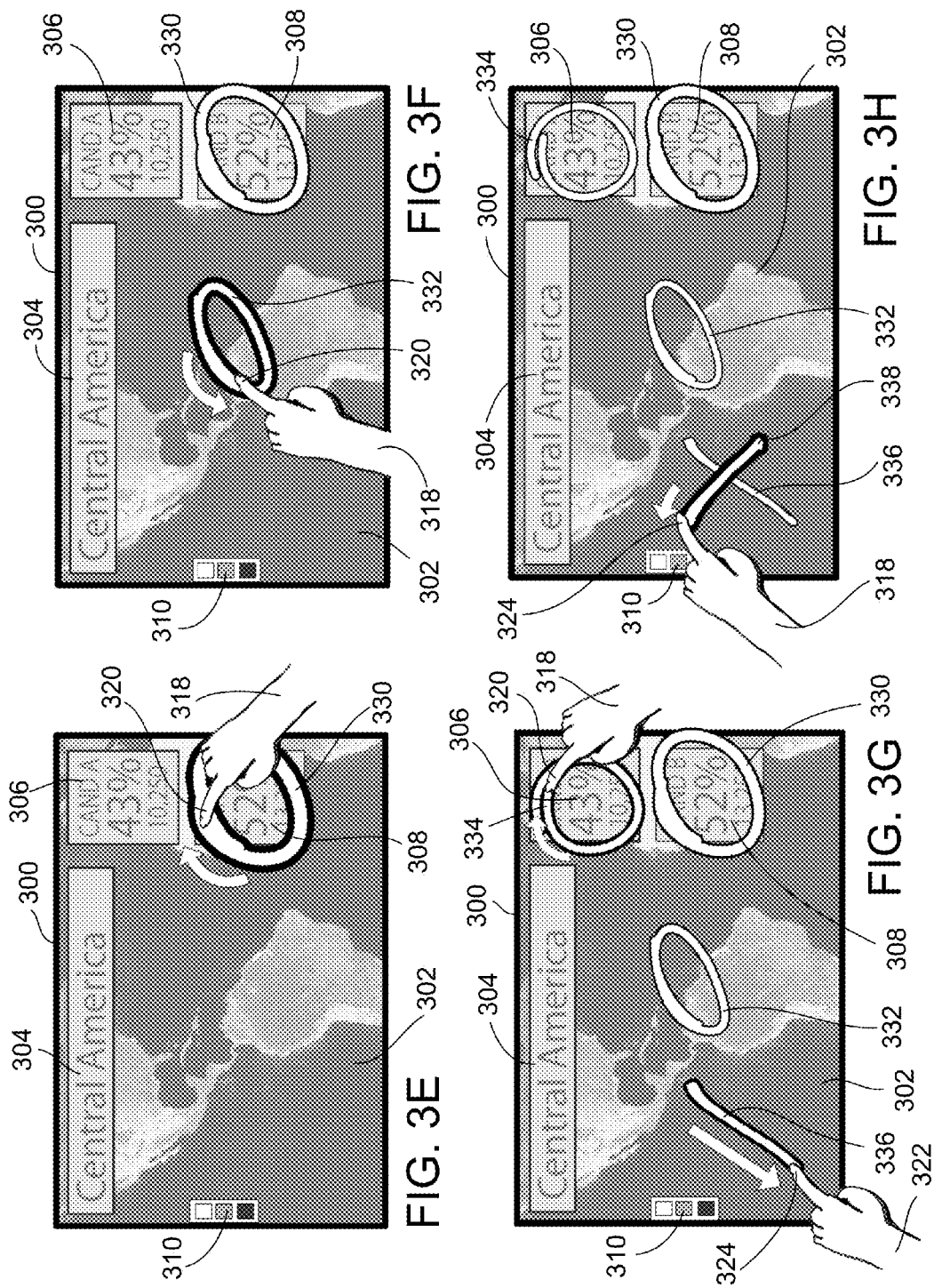

MULTI-LAYER TELESTRATION ON A MULTI-TOUCH DISPLAY DEVICE

CROSS REFERENCE TO RELATED APPLICATION

This application claims the benefit of U.S. Provisional Application No. 61/142,625, filed Jan. 5, 2009, and titled "Multi-Layer Telestration on a Multi-Touch Display Device", the disclosure of which is considered part of (and is incorporated by reference in) the disclosure of this application.

TECHNICAL FIELD

This disclosure relates to multi-layer telestration on a multi-touch display device.

BACKGROUND

Multi-point input computing systems receive, recognize, and act upon multiple inputs at the same time. Multi-touch display devices represent one particular class of multi-point input computing systems.

Generally, touch-screen display devices are capable of detecting input from a user by detecting the presence and location of a touch on, within, or within the vicinity of the surface of the display area. Some touch-screen display devices require that a user physically touch the surface of the display area, for example with a finger, stylus, or other input mechanism, in order to engage the surface of the touch-screen display device. Other touch-screen display devices are capable of receiving input by detecting that a user's finger, a stylus, or some other input mechanism has engaged the surface of the touch-screen display device by hovering around, or otherwise in the vicinity of, a particular location on the surface of the display area.

Multi-touch display devices often adopt many of the characteristics of touch-screen display devices, and yet they are generally more sophisticated than traditional touch-screen display devices in that they are capable of detecting the presence and location of multiple touches on, within, or within the vicinity of the surface of the display area at the same time. Like traditional touch-screen display devices, some multi-touch display devices require that a user physically touch the surface of the display area with one or more fingers, styluses, and/or other mechanisms in order to engage the surface of the multi-touch display device, while other multi-touch display devices are capable of receiving input by detecting that one or more fingers, styluses, and/or other input mechanisms have engaged the surface of the multi-touch display device by hovering around, or otherwise in the vicinity of, the surface of the display area.

SUMMARY

A multi-touch display device is configured to display multiple objects concurrently at various different layers thereby providing a sense of depth to the display. In addition, the multi-touch display device also is configured to enable a user to create annotations through interaction with the multi-touch display device. These annotations may be assigned to various of the different layers.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program stored on a tangible, computer-readable storage medium. The tangible, computer-readable storage medium may include, for example, instructions that, when executed, cause a computer to perform acts specified by the instructions.

The details of one or more implementations are set forth in the accompanying drawings and the description below. Other features will be apparent from the description and the drawings, and from the claims.

DESCRIPTION OF DRAWINGS

FIGS. 3A-3J are diagrams of a multi-touch display device configured to be operated in either of a manipulation mode or an annotation mode that illustrate various user interactions with the multi-touch display device enabled by the multi-touch display device.

DETAILED DESCRIPTION

A multi-touch display device is configured to operate in either a telestration (annotation) mode or a manipulation mode. When operating in the annotation mode, the multi-touch display device detects user interaction with the surface of the multi-touch display device and converts the detected interaction into annotations that are displayed by the multi-touch display device. In contrast, when operating in manipulation mode, the multi-touch display device detects user interaction with the surface of the multi-touch display device, interprets detected interactions as instructions to apply transformation operations on content displayed by the multi-touch display device, and, applies appropriate transformation operations in response.

In some implementations, the multi-touch display device assigns displayed objects to different layers, thereby providing a sense of depth to the display. In such implementations, the multi-touch display device is configured to intelligently determine the layer to which it will apply detected user interactions with the surface of the multi-touch display device, and, depending on whether the device is operating in annotation or manipulation mode, whether to apply an annotation or a transformation to the appropriate layer (to the exclusion of other layers) based on the detected user interactions. Additionally or alternatively, the multi-touch display device may be configured to intelligently determine the object to which it will apply a detected user interaction, within any given layer, and to apply an annotation or a transformation to the appropriate object (to the exclusion of other objects, even within the same layer) based on the detected interaction.

Figure 1A:
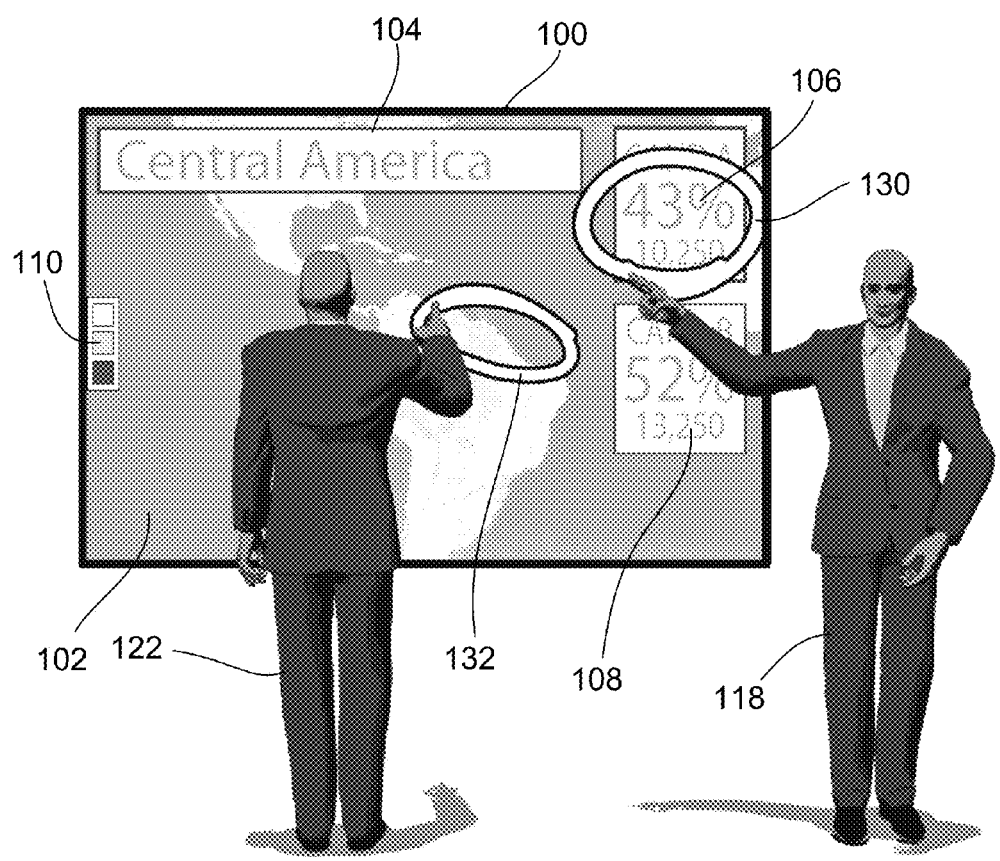
FIGS. 1A-1B are diagrams a multi-touch display device that illustrate various user interactions with the multi-touch display device enabled by the multi-touch display device.

FIG. 1A illustrates an exemplary multi-touch display device 100 that is configured to operate in an annotation mode. As illustrated in FIG. 1A, the multi-touch display device 100 is displaying informational window objects 104, 106, and 108 and a map object 102. The multi-touch display device 100 has assigned the informational window objects 104, 106, and 108 to a virtual layer (not shown) that is closer to the foreground of the display than the virtual layer (not shown) to which the multi-touch display device 100 has assigned the map object 102. As a consequence, the multi-touch display device 100 displays the informational window objects 104, 106, and 108 such that they appear in front of, or on top of, map object 102. Multi-touch display device 100 also is displaying a control object 110 at a virtual layer (not shown) that is closer to the foreground than either of the virtual layers to which the informational window objects 104, 106, and 108 or the map object 102 are assigned. The control object 110 provided by the multi-touch display device 100 is actuatable to toggle the mode within which the multi-touch display device 100 is operating back and forth between the annotation mode and a manipulation mode. As illustrated in FIG. 1A, the multi-touch display device 100 is operating in the annotation mode. Consequently, in response to detecting user interaction with control object 110, the multi-touch display device 100 is configured to transition the multi-touch display device 100 to the manipulation mode.

Referring to FIG. 1A, commentators 118 and 122 are interacting with the multi-touch display device 100 simultaneously. Specifically, commentator 118 is interacting with the multi-touch display device 100 in a top right-hand region of the multi-touch display device 100 that corresponds to informational window object 106, and commentator 122 is interacting with the multi-touch display device 100 in a central region of the multi-touch display device 100 that corresponds to map object 102.

The multi-touch display device 100 has detected input from commentator 118 as a result of commentator 118 engaging the surface of the multi-touch display device 100 with a finger. In the annotation mode, input from commentator 118 is converted into an annotation, which the multi-touch display device 100 displays as annotation 130. The detected position of the input received from commentator 118 is related to the position of one or more objects and/or layers being displayed, such that the input received from commentator 118 is associated with one or more objects and/or layers presently displayed, informational window object 106 in the illustrated case. Thus, the multi-touch display device 100 associates annotation 130 with the virtual layer to which informational window object 106 is assigned. Thereafter, if the multi-touch display device 100 is transitioned to operate in the manipulation mode, and the multi-touch display device 100 applies a transformation to the layer to which informational window object 106 is assigned, the multi-touch display device 100 concurrently applies the same transformation to annotation 130 as well, without requiring any additional input from commentator 118 or otherwise.

The multi-touch display device 100 also and concurrently detects input from commentator 122 as a result of commentator 122 engaging the surface of the multi-touch display device 100. In the annotation mode, input from commentator 122 is converted into an annotation, which the multi-touch display device 100 displays as annotation 132. The detected position of the input received from commentator 122 is itself related to the position of one or more objects or layers being displayed, such that the input received from commentator 122 is associated with one or more objects/layers presently displayed, map object 102 in the illustrated case. Thus, the multi-touch display device 100 associates annotation 132 with the virtual layer to which map object 102 is assigned. Thereafter, if the multi-touch display device 100 is transitioned to operate in the manipulation mode, and the multi-touch display device 100 applies a transformation to the layer to which map object 102 is assigned, the multi-touch display device 100 concurrently applies the same transformation to annotation 132 as well, without requiring any additional input from commentator 122 or otherwise.

As discussed above, the multi-touch display device 100 is configured to transition between operating in the annotation mode and the manipulation mode in response to detecting that the user engaged the portion of the surface of the multi-touch display device 100 corresponding to control object 110. Additionally or alternatively, the multi-touch display device 100 also may be configured to transition between operating in annotation mode and transformation mode in response to detecting that a user has applied a single tap (e.g., engaged the surface of the multi-touch display device 100 for less than a threshold distance and/or for less than a threshold period of time), a specific sequence of taps, a chorded tap, or any of various different system-defined gestures for transitioning operation modes to any location on the surface of the multi-touch display device 100.

Figure 1B:
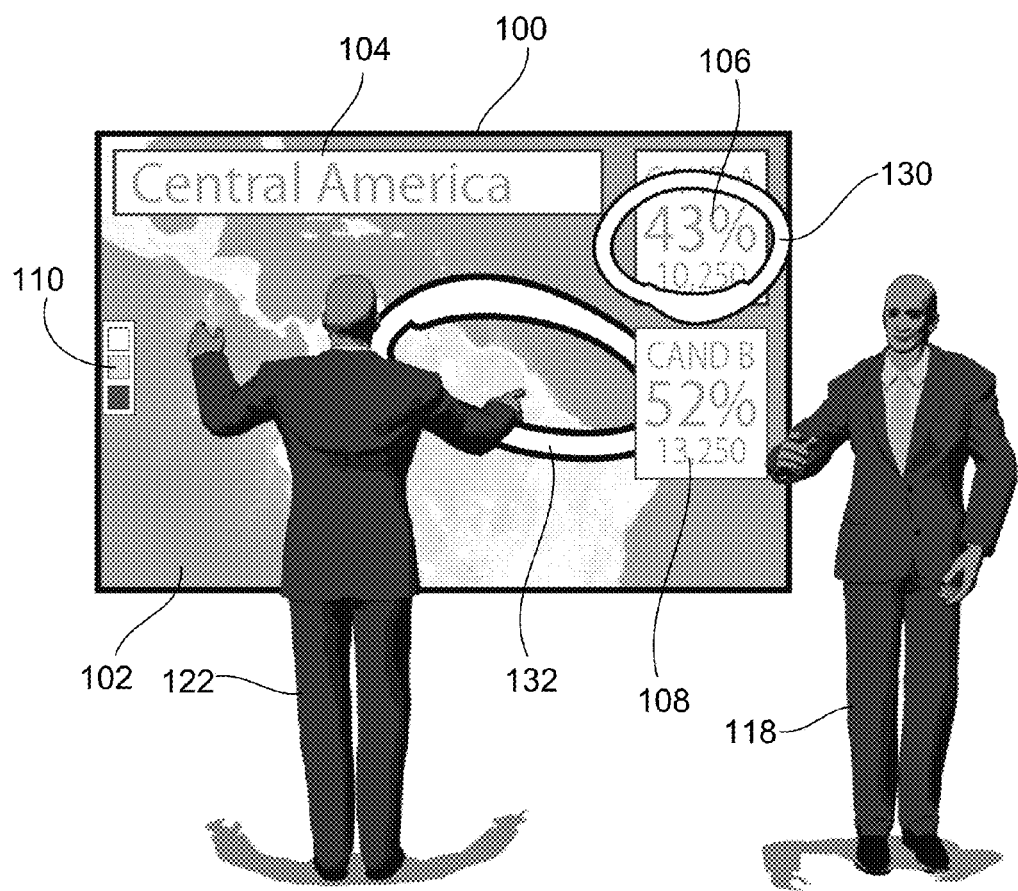

FIG. 1B illustrates the multi-touch display device 100 operating in manipulation mode. Commentator 122 is interacting with the multi-touch display device 100 in a region of the multi-touch display device 100 that corresponds to map object 102. The multi-touch display device 100 detects input from commentator 122 as a result of commentator 122 engaging the surface of the multi-touch display device 100 with one finger from his left hand and one finger from his right hand. Based on the detected positions of the commentator's 122 two fingers, the multi-touch display device 100 determines to apply the input received from commentator 122 to map object 102. Therefore, the multi-touch display device 100 interprets the input received from commentator 122 as a request to apply a transformation to the virtual layer to which map object 102 is assigned.

As illustrated in FIG. 1B, the multi-touch display device 100 detects that the commentator 122 is extending the distance between the two fingers with which commentator 122 is engaging the surface of the multi-touch display device 100. Interpreting this movement of the commentator's 122 fingers as an instruction to apply a uniform scaling transformation operation to the layer to which map object 102 is assigned, the multi-touch display device 100 uniformly increases the scale of (i.e. zooms in on) the layer to which map object 102 is assigned as well as its corresponding objects and annotations, including map object 102 and annotation 132. During this scaling operation, the multi-touch display device 100 maintains the visual relationships between the map object 102 and annotation 132.

Notably, the multi-touch display device 100 applies the uniform scaling transformation operation on map object 102 and annotation 132, but the multi-touch display device 100 does not similarly apply the uniform scaling transformation to any of the other virtual layers or their corresponding objects and annotations. Thus, as illustrated in FIG. 1B, informational window objects 104, 106, and 108, annotation 130, and control object 110 remain unchanged from FIG. 1A despite the transformation operation applied to map object 102 and annotation 132. This is because informational window objects 104, 106, and 108, annotation 130, and control object 110 correspond to different virtual layers than the virtual layer to which the transformation operation is applied.

In addition, as also illustrated in FIG. 1B, the multi-touch display device 100 maintains the visuo-spatial depth of the displayed objects and annotations. For example, as the multi-touch display device 100 increases the scale of annotation 132, annotation 132 extends into a region of the display that overlaps with the location of informational window object 108. Therefore, because the multi-touch display device 100 assigned informational window object 108 to a virtual layer (not shown) that is closer to the foreground than the virtual layer (not shown) with which the multi-touch display device 100 associated annotation 132, the multi-touch display device displays informational window object 108 and annotation 132 such that the portion of informational window object 108 that overlaps with annotation 132 occludes the portion of annotation 132 with which it overlaps.

In the following discussion, multi-touch display devices generally are described as universally operating in either the annotation mode or the manipulation mode. However, in some implementations, a multi-touch display device may be configured to support apportioning of the multi-touch display device into different virtual areas, each of which can be operated in a different mode. For example, referring to FIG. 1A, the surface of the multi-touch display device 100 may be divided into virtual areas such that the multi-touch display device 100 interprets the detected input from user 118 as a received annotation while simultaneously interpreting the detected input from user 122 as an instruction to apply a transformation.

As discussed above, a multi-touch display device may compose a rendered display out of multiple different virtual layers that are stacked on top of one another, thereby providing an element of depth to the display. Although a multi-touch display device may compose a rendered display out of any number of different virtual layers, in one specific implementation, a multi-touch display device composes a display out of a background layer, a mid-ground layer, and a foreground layer. In this implementation, the multi-touch display device assigns each individual object to be displayed to one of the three virtual layers. The multi-touch display device then renders the display by displaying objects assigned to the foreground layer such that they occlude, fully or partially, objects with which they overlap that are assigned to the mid-ground or background layers. Similarly, the multi-touch display device displays objects assigned to the mid-ground layer such that they occlude, fully or partially, objects with which they overlap that are assigned to the background layer. In some cases, the multi-touch display device also or alternatively may support a logical ordering of the different constituent objects assigned to a single particular layer. In such cases, the multi-touch display device displays objects assigned to the same layer such that higher-ordered objects occlude lower-ordered objects assigned with which they overlap.

When a multi-touch display device associates annotations with different layers, such as, for example, described above in connection with FIGS. 1A-1B, the multi-touch display device displays the annotations in a fashion that is consistent with the visuo-spatial depth of the layers to which the annotations are associated. In addition, for layers with which annotations have been associated, the multi-touch display device orders the annotations associated with the layer such that the annotations occupy higher levels within the layer than the objects assigned to the layer. As a result, when the multi-touch display device renders the display, annotations associated with a layer are visually overlaid on top of the objects assigned to the layer. Furthermore, the multi-touch display device also may apply a temporal ordering to the annotations associated with each layer such that recently received annotations associated with a layer occupy higher orders within the layer than older annotations associated with the layer.

Figure 2A:
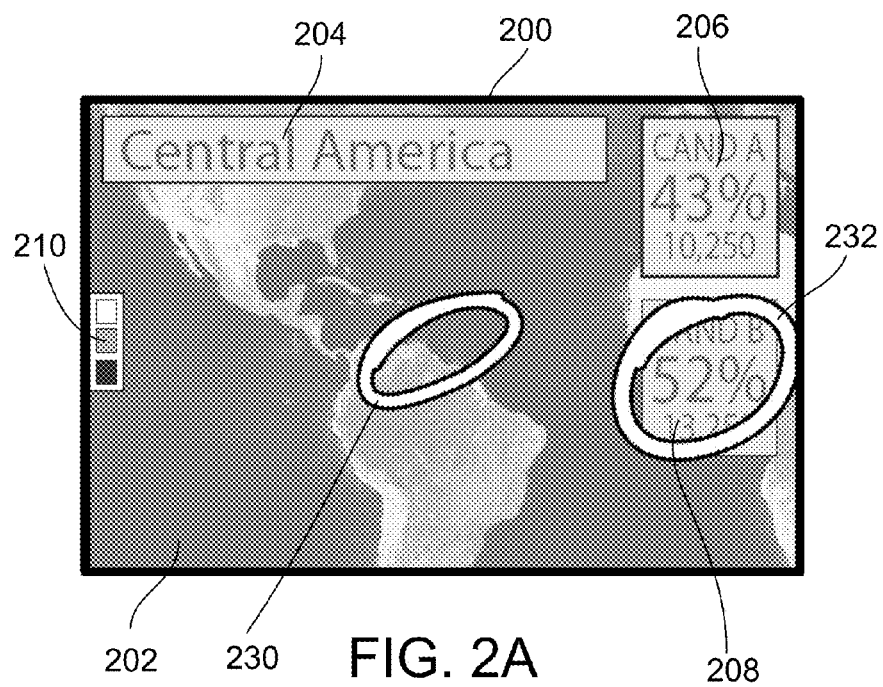
FIGS. 2A-2B are diagrams of a multi-touch display device configured to display multiple constituent virtual layers and annotations associated with different of these multiple constituent virtual layers.
Figure 2B:
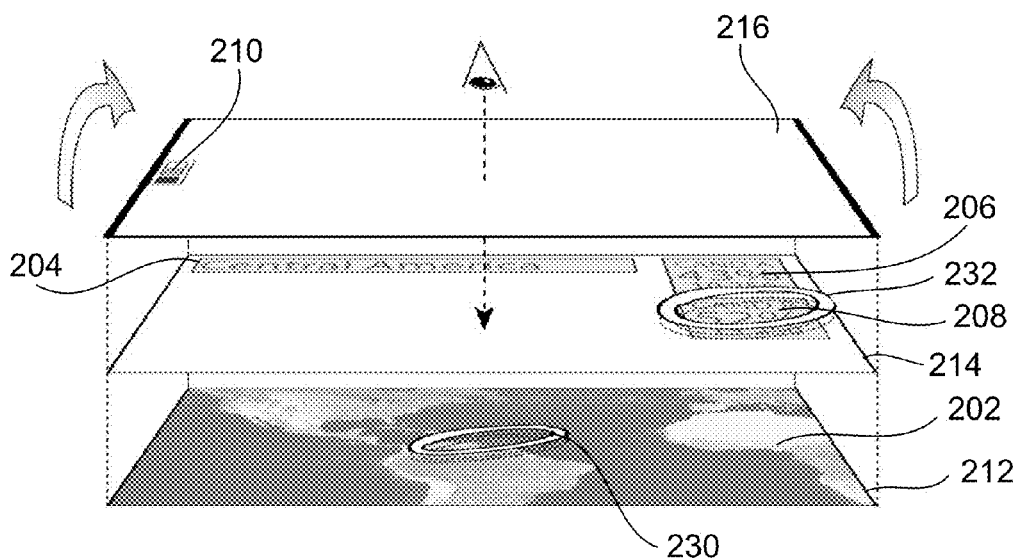

FIGS. 2A-2B illustrate an exemplary multi-touch display device showing multiple constituent virtual layers and annotations associated with different of these multiple layers. FIG. 2A illustrates multi-touch display device 200 as a user would perceive it. As illustrated in FIG. 2A, the multi-touch display device 200 is displaying a map object 202; three informational window objects 204, 206, and 208; a control object 210; and two annotations B30 and B32. As described in greater detail below, the multi-touch display device 200 may employ different techniques for assigning objects to and associating annotations with different layers. For present explanatory purposes, however, the assignments and associations are simply given and are illustrated in FIG. 2B.

FIG. 2B is an exploded view of FIG. 2A that illustrates the different constituent virtual layers within the display, the objects assigned to each layer, and the annotations associated with each layer or constituent objects therein. As illustrated in FIG. 2B, the multi-touch display device 200 assigns the map object 202 to a lowest or background layer 212, and it also associates the annotation B30 with a lowest or background layer 212. Notably, the multi-touch display device 200 orders annotation B30, such that annotation B30 occupies a higher order within layer 212 and thus overlays the map object 202 when the multi-touch display device 200 renders the display. Likewise, the multi-touch display device 200 assigns the informational window objects 204, 206, and 208 to a middle or mid-ground layer 214, and it also associates the annotation B32 with the middle or mid-ground layer 214. Again, the multi-touch display device 200 orders annotation B32, such that annotation B32 occupies a higher order within layer 214 and thus overlays informational window 208 when the multi-touch display device 200 renders the display. Finally, the multi-touch device 200 assigns the control object 210 to a top or foreground layer 216.

Figure 3A:
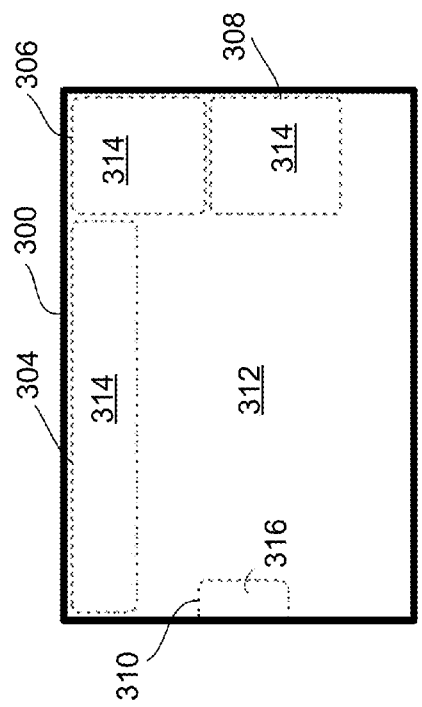

FIGS. 3A-3J are a series of figures of a user interacting with a multi-touch display device 300 that is configured to be operated in either of a manipulation mode or an annotation mode. As illustrated in FIG. 3A, the multi-touch display device 300 is displaying a map object 302 at a first layer, three informational window objects 304, 306 and 308 at a second layer, and a control object 310 at a third layer.

Figure 3B:
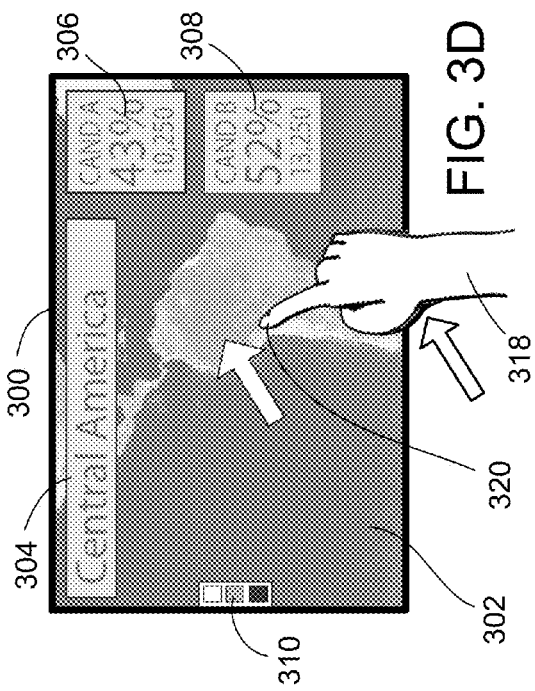

FIG. 3B schematically illustrates the different layers to which the multi-touch display device 300 has assigned each of the displayed objects. Referring to FIG. 3B, map object 302 is assigned to layer 312, the three information window objects (304, 306, 308) are all assigned to layer 314, and the control object 300 is assigned to layer 316. Relative to layers 314 and 316, layer 312 is further from the foreground. Consequently, the multi-touch display device 300 displays the information window objects (304, 306, and 308), which are assigned to layer 314, and the control object 310, which is assigned to layer 316, such that the information window objects (304, 306, and 308) and the control object occlude the portions of the map object 302 with which they overlap.

The multi-touch display device 300 interprets detected input in different ways depending on the mode in which the multi-touch display device 300 is operating. When operating in the manipulation mode, the multi-touch display device 300 performs transformations on displayed objects in response to detecting user input. In contrast, when operating in the annotation mode, the multi-touch display device 300 interprets detected input as annotations to be applied to displayed objects or layers.

In order to enable a user to toggle between the manipulation mode and the annotation mode, the multi-touch display device 300 provides control object 310. Irrespective of the mode within which the multi-touch display device 300 is operating, the multi-touch display device 300 displays control object 310 at a layer that is higher than any other objects displayed by the multi-touch display device 300. The visible boundary of control object 310 also may define a region of the multi-touch display device 300 that is active only for receiving input to change between the transformation and annotation modes. That is to say, the visible boundary of control object 310 may define a region that is inactive for receiving input to transform or annotate an object and/or a layer. As a result, control object 310 remains generally accessible to a user of the multi-touch display device 300, irrespective of the mode within which the multi-touch display device is operating and other objects displayed by the multi-touch display device 300. The multi-touch display device 300 is configured to change the mode within which it is operating in response to detecting input in the region defined by the control object 310. In some implementations, additional or alternative controls may define regions that are active only for receiving input related to such controls such that these controls, like control object 310 are immune from annotation and/or transformation.

When in manipulation mode, the multi-touch display device 300 is configured to apply transformations to objects displayed on the multi-touch display device 300 in response to detecting inputs on the surface of the multi-touch display device 300. For example, the multi-touch display device 300 may be configured to transform by translating, rotating, and/or uniformly scaling displayed objects in response to detecting inputs on the surface of the multi-touch display device 300. In some implementations, the multi-touch display device 300 applies such transformations on a per layer basis. As such, because the map object 302 and the information windows objects 304, 306, and 308 are displayed at different layers, the multi-touch display device 300 may apply a transformation to map object 302 without affecting the display of informational window objects 304, 306 and 308. Similarly, the multi-touch display device 300 may apply a transformation to informational window objects 304, 306, and 308 without affecting the display of map object 302.

Figure 3C:
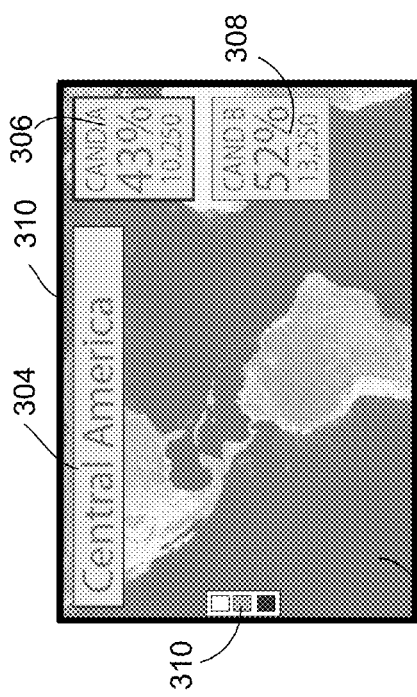
Figure 3D:
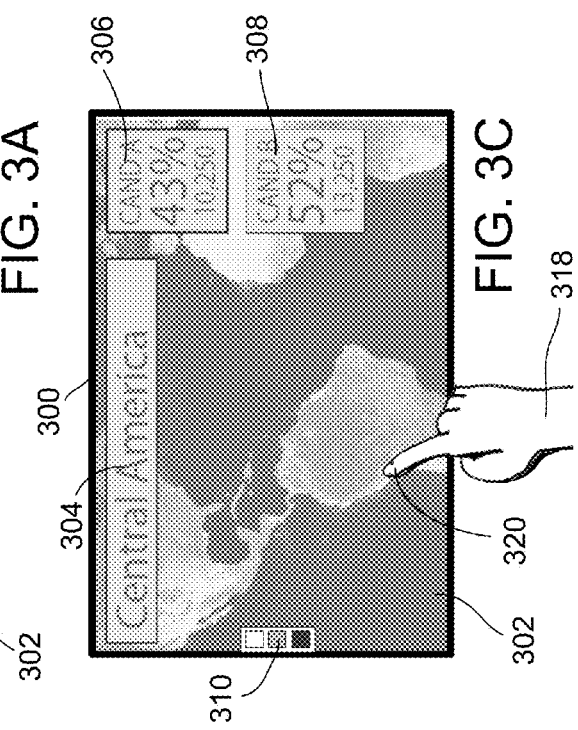

FIGS. 3C-3D illustrate the multi-touch display device 300 applying a transformation to an object assigned to one layer independently of objects assigned to different layers and the effect this transformation has on the other objects assigned to different layers. A user 318 engages the multi-touch display device 300 by touching a finger 320 to its surface. The multi-touch display device detects the position at which the finger is touching its surface and determines, based on the detected position of the finger, with which layer to associate this input. In this example, the multi-touch display device 300 determines with which layer to associate the input by identifying the object that is displayed at the highest layer (i.e., closest to the foreground) at the position where the finger 320 first engaged the surface of the multi-touch display device 300. The multi-touch display device 300 then associates the input with the layer to which this object is assigned. As illustrated in FIG. 3C, for example, the finger 320 has engaged the surface of the multi-touch display device 300 at a position that corresponds to the map object 302, because this is the object at the highest layer at the position on the multi-touch display device 300 engaged by the finger 320. Thus, because the map object 302 is assigned to layer 312, the multi-touch display device 300 determines that the input is to be applied to layer 312 in response to detecting that the finger 320 engages the surface of the multi-touch display device 300 at the position corresponding to the map object 302. Referring to FIG. 3D, the user has dragged the finger 320 across the surface. As the user dragged the finger 320 across the surface, the multi-touch display device 300 detected the movement of the finger 320 and, in response, translated the map object 302 to a new position. Since the map object 302 is the only object assigned to layer 312, the multi-touch display device translated the map object but did not manipulate any of the other objects (i.e. information window objects 304, 306 and 308, and control object 310) that are assigned to different layers.

At any point, the user can change the mode within which the multi-touch display device 300 is operating by engaging the portion of the surface of the multi-touch display device 300 in which control object 310 is displayed. In this case, the multi-touch display device 300 detects the input and associates the position of the detected input with control object 310. Since it has previously assigned control object 310 with layer 316, the multi-touch display device 300 interprets this input as a control setting operation. As such, based on the position of the detected input, the multi-touch display device 300 will, for instance, set itself to a different mode. Therefore, in response to detecting that user 318 has engaged the surface of the multi-touch display device 300 in the location at which control object 310 is displayed, the multi-touch display device 300 transitions from manipulation mode to annotation mode.

When the multi-touch display device 300 is in annotation mode, the multi-touch display device 300 converts detected input to annotations that are displayed by the multi-touch display device 300. FIGS. 3E-3H illustrate operation of the multi-touch display device 300 in annotation mode. In FIG. 3E user 318 engages the multi-touch display device 300 by touching a finger 320 to its surface. The multi-touch display device 300 detects the position at which the finger 320 initially touches its surface and determines, based on the detected position of the finger, with which layer to associate this input. To establish this association, the multi-touch display device 300 determines how the initially detected position of the finger 320 relates to the visual positions of the objects being displayed by multi-touch display device 300. In the case of FIG. 3E, the finger 320 initially touches a position within the visual boundaries of informational window object 308, which is assigned to layer 314, and map object 302, which is assigned to layer 312. Due to the fact that layer 314 is higher (i.e., closer to the foreground) than layer 312, the multi-touch display device 300 associates the detected input with layer 314. Thereafter, based on the fact that the multi-touch display device 300 is operating in the annotation mode and due to having associated the input with layer 314, the multi-touch display device 300 tracks the movement of the finger 320 and converts detected movement by the finger 320 into an annotation which the multi-touch display device 300 stores and displays as being associated with layer 314.

As illustrated in FIG. 3E, as the user 318 moves the finger 320 over the surface of the multi-touch display device 300 in a circular path, the multi-touch display device 300 tracks the movement of the finger 320 and displays and stores this detected input as an annotation 330 that is associated with layer 314. Notably, the multi-touch display device 300 maintains this association between annotation 330 and layer 314 even though parts of the annotation 330 extend beyond the visual boundaries of informational window 308, and thus, also extends into a region of the display that is not associated with layer 314, but rather is associated with the map object 302 and layer 312. For instance, the multi-touch display device 300 treats the detected movement of the finger 320 as a single, continuous input irrespective of the fact that the movement of the finger 320 traveled beyond the visible boundaries of informational window 308.

The multi-touch display device 300 displays the stored annotation 330 in a visuo-spatial manner that is consistent with the annotations association with layer 314. As such, the annotation 330 visually occludes all objects assigned to and annotations previously associated with layer 314 and any layers visually lower (i.e. closer to the background) than layer 314. Thus, annotation 330 is illustrated in FIG. 3E as visually occluding informational window object 308, which is assigned to layer 314, and map object 302, which is assigned to layer 312, which is visually lower than layer 314.

Similarly, FIG. 3F shows user 318 moving finger 320 in a circular manner across a different part of the surface of the multi-touch display device 300. In this case, the multi-touch display device 300 detects that the initial position of the detected input is only within the visual boundaries of map object 302. Therefore, because map object 302 is assigned to layer 312, the multi-touch display device 300 associates the new detected input with layer 312. As finger 320 draws a circle across the surface of the multi-touch display device 300, the multi-touch display device 300 tracks the movement of the finger 320 and converts detected movement of the finger 320 into an annotation 332, which the multi-touch display device 300 displays and stores in a visuo-spatial manner that is consistent with layer 312.

Multi-touch display device 300 is configured to detect multiple inputs at the same time. As illustrated in FIG. 3G, user 318 is moving finger 320 across the surface of the multi-touch display device 300 at the same time that user 322 is moving finger 324 across the surface of the multi-touch display device 300. In response, the multi-touch display device 300 detects the circular input of finger 320 and associates the input with layer 314 by virtue of the finger 320 having initially engaged the surface of the multi-touch display device 300 in a position that is within the visual boundaries of informational window object 306, which is assigned to layer 314. In addition, the multi-touch display device converts the detected circular input into an annotation 334, which the multi-touch display device 300 displays and stores in a visuo-spatial manner that is consistent with the annotation's association with layer 314. At the same time, the multi-touch display device 300 detects the linear input of finger 324 and associates the input with layer 312 by virtue of the finger 324 having initially engaged the surface of the multi-touch display device 300 in a position that is within the visual boundaries of map object 302, which is assigned to layer 312. In addition, the multi-touch display device converts the detected linear input into an annotation 336, which the multi-touch display device 300 displays and stores in a visuo-spatial manner that is consistent with the annotation's association with layer 314.

As the multi-touch display device 300 detects inputs and converts the detected inputs into annotations, the multi-touch display device 300 stores and displays the annotations as a function of the temporal order in which they were received. Specifically, the multi-touch display device 300 stores and displays the various different annotations associated with any given layer such that the annotations are visually stacked on top of one another in the order that they are received.

For example, referring to FIG. 3H, some time after user 318 completed drawing annotation 336, user 318 reengaged the surface of the multi-touch display device with finger 320 and began tracing finger 320 across the surface of the multi-touch display device 300 in a different direction. In response, the multi-touch display device 300 detected that the initial position of the detected input fell only within the visual boundaries of map object 302 and no other object. Therefore, because map object 302 is assigned to layer 312, the multi-touch display device 318 associated the detected input with layer 312. As finger 320 draws a new line across the surface of the multi-touch display device 300, the multi-touch display device 300 converts the tracked movement of the finger 320 into an annotation 330, which it stores and displays as being associated with layer 312. As illustrated in FIG. 3H, as finger 320 traced this new line, finger 320 intersected previously stored and displayed annotation 336. Consequently, because the multi-touch display device 300 is configured to store and display annotations associated with any given layer in a manner that reflects the temporal order in which they were received, the multi-touch display device 300 displays annotation 338 such that the portion of annotation 338 that overlaps with a portion of annotation 336 occludes the portion of annotation 336 that it overlaps. In some alternative implementations, the multi-touch display device may not store and display annotations associated with a given layer in a manner that reflects the temporal order in which the annotations were received. Rather, for all annotations associated with a given layer, the multi-touch display device 300 may visually flatten the annotations such that they are combined into a single annotation.

Figure 3I:
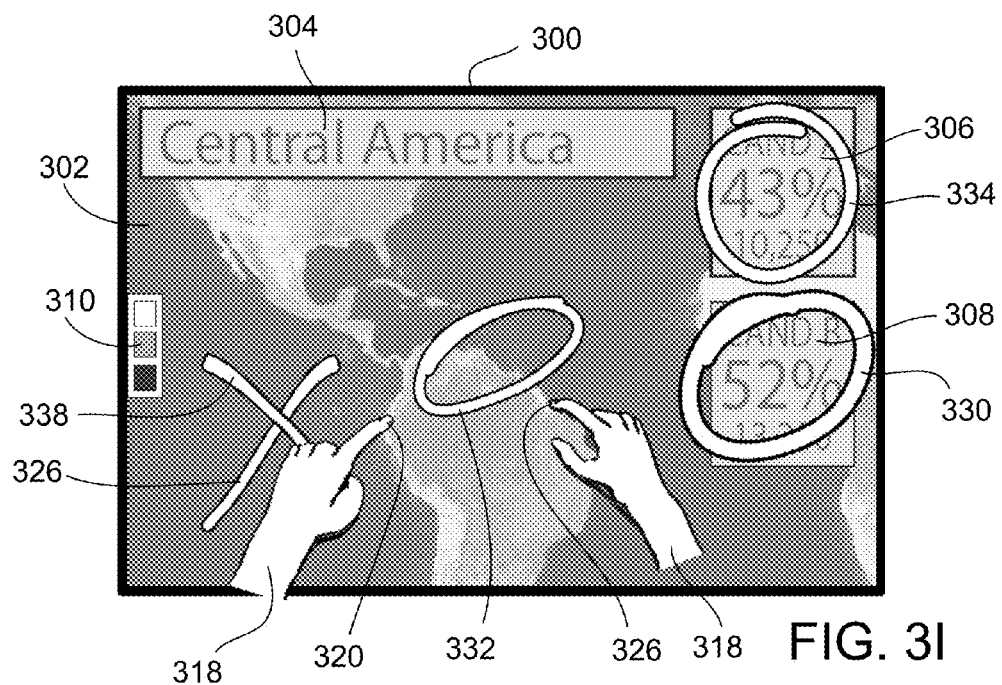
Figure 3J:
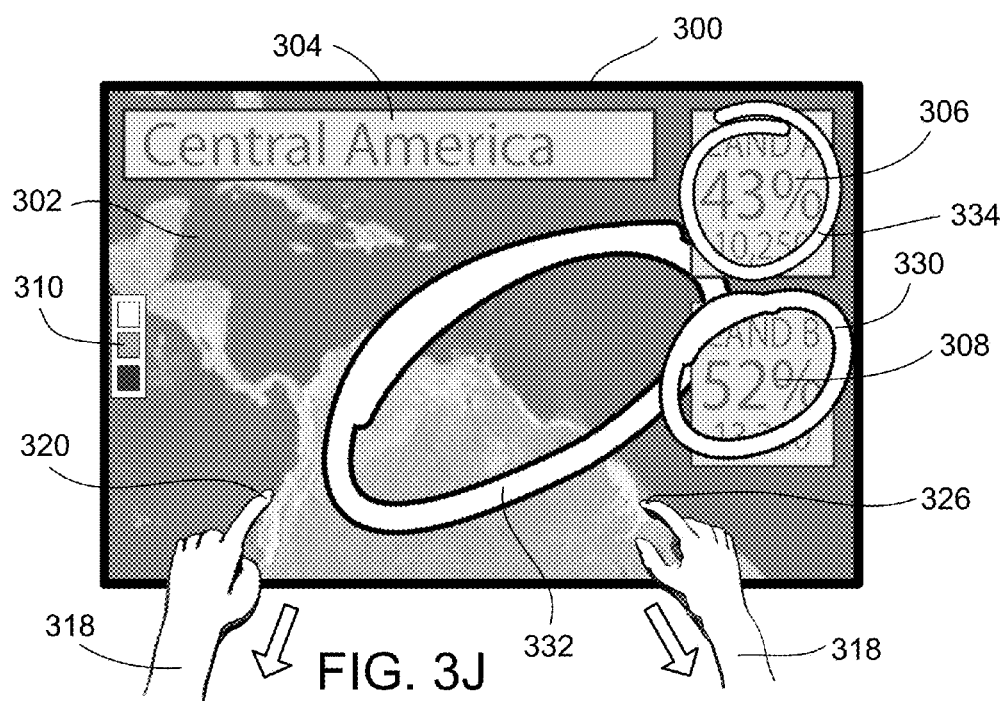

FIGS. 3I-3J illustrate the multi-touch display device 300 applying a transformation to layer 318, along with its assigned objects and associated annotations, independently of other layers. In this case, the multi-touch display device has again detected that the user has engaged the surface of the multi-touch display device 300 in a position corresponding to the control object 310, and, in response, the multi-touch display device has set itself to manipulation mode. Consequently, rather than converting received input into annotations, the multi-touch display device 300 again applies transformations to displayed layers and their assigned objects in response to detecting user interaction with the surface of the multi-touch display device 300.

As illustrated in FIG. 3I, the user 318 is engaging the multi-touch display device 300 by touching two fingers 320 and 326 to its surface at the same time. In response, the multi-touch display device 300 detects the initial positions at which each of the two fingers 320 and 326 initially engaged its surface and determines, based on the detected initial positions of the fingers 320 and 326, with which layer (or layers) to associate these inputs. In this case, the multi-touch display device 300 detects that the positions at which fingers 320 and 326 initially engaged the surface of the multi-touch display device 300 correspond to positions that are located within the visual boundaries of the map object 302, but no other objects. Consequently, because map object 302 is assigned to layer 312, the multi-touch display device 300 associated both detected inputs with layer 312. Furthermore, since the multi-touch display device 300 associates both detected inputs with layer 312, and because both fingers remain engaged with the multi-touch display device 300 concurrently, the multi-touch display device 300 processes and treats both detected inputs as a single input operation while both fingers remain concurrently engaged with the surface of the multi-touch display device 300.

Referring to FIG. 3J, the user 318 is dragging finger 320 toward the lower left of the multi-touch display device 300 while simultaneously dragging finger 326 toward the lower right corner of the multi-touch display device 300. As the user 318 drags the fingers 320 and 326 across the surface in this manner, the multi-touch display device 300 detects the movement of the fingers 320 and 326, and, in response, interprets the movement of the fingers as an instruction to apply a uniform scaling transform operation to layer 312. Therefore, in response to detecting the input from fingers 320 and 326, the multi-touch display device 300 uniformly increases the scale of (i.e., zooms in on) each object assigned to and each annotation associated with layer 312 (i.e., map object 302 and annotations 332, 336, and 338).

In addition, because the multi-touch display device applies the transformation to the layer 312 as a whole, the positions of and the relationships between the objects assigned to and the annotations associated with layer 312 are preserved while the multi-touch display device 300 applies the transformation to layer 312. Thus, as reflected in FIG. 3J, the multi-touch display device 300 zoomed in on the map object 302, while also enlarging the annotations 332, 336, and 338. In addition, the multi-touch display device 300 maintained the spatial relationships between each of annotations 332, 336, and 338 and map object 302. As such, annotations 336 and 338 are no longer visible due to the magnitude of the scale increase applied to layer 312. Furthermore, since the multi-touch display device 300 applied the transformation only to layer 312, and not layers 314 and 316, and their corresponding objects (i.e., informational window objects 304, 306, and 308, and control object 310) and annotations (i.e., 330 and 334) were maintained unchanged. Moreover, as the multi-touch display device 300 increases the scale of annotation 332, annotation 332 extends into a region of the display that overlaps with the location of informational window objects 306 and 308, and annotation 330. Therefore, because the multi-touch display device 300 assigned informational window objects 306 and 308 and annotation 330 to layer 314, which is closer to the foreground than layer 312, the layer to which the multi-touch display device 300 associated annotation 332, the multi-touch display device 300 displays informational window objects 306 and 308 and annotations 330 and 332 such that the portions of informational window objects 306 and 308 and annotation 330 that overlap with annotation 332 occlude the portion of annotation 332 with which they overlap.

A multi-touch display device that provides for multi-layer annotation may employ various different rules to determine to which layer a received annotation is to be associated when operating in annotation mode. For example, as described above in connection with FIGS. 3C and 3E, in one implementation, a multi-touch display device identifies within which of the different objects, the visible boundaries of which the annotation was begun, is assigned to the highest layer (i.e., the layer closest to the foreground) and associates the annotation with the layer to which this object is assigned. In an alternative implementation, a multi-touch display device may extend the active region of a displayed object beyond the actual visual boundary of the object. In such an implementation, the multi-touch display device may associate a received annotation with a particular layer based on detecting that an annotation began within the extended active region of an object assigned to the particular layer.

FIGS. 4A-4D are a series of figures of a multi-touch display device that employs active regions that extend beyond the visual boundaries of displayed objects to determine to which layer a received annotation is to be assigned. These active regions effectively extend the boundaries of each object within which the initial position of an input may be detected so as to be associated with the object, and thus associated with the layer to which the object is assigned. Furthermore, in some implementations, in response to associating an annotation to a layer to which an initially engaged object corresponds, the multi-touch display device temporarily may extend the active region for the initially engaged object to temporarily include a region surrounding the newly stored and displayed annotation. In other words, when an annotation stroke is detected that initially begins within the active region of one object but subsequently extends beyond the active region of that object, the active region for the object temporarily may be extended to include a region surrounding the portion of the annotation stroke that extends beyond the active region of the object. During the temporary period of time during which the extended active region surrounding the annotation stroke remains active, any annotation stroke received within the extended active region will be treated as a continuation of the original annotation stroke, and thus will be associated with the same layer as the original annotation stroke. This functionality may prove useful in preserving the continuity of annotations that extend beyond the active regions of an object and that require a user to temporarily disengage the surface because the annotation requires multiple strokes (e.g., dotting an "i", crossing a "t", or drawing an arrowhead).

Figure 4B:
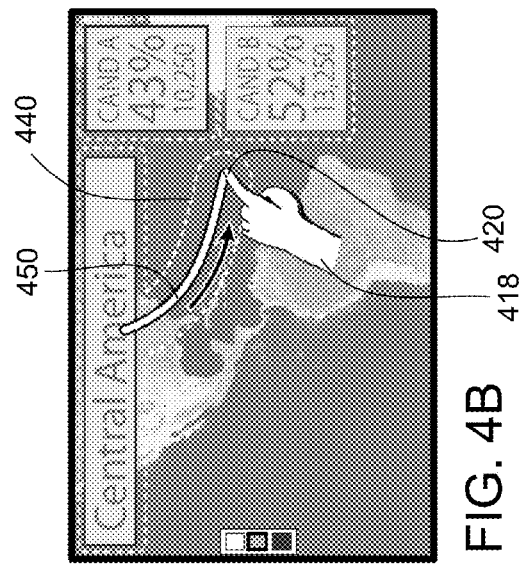
FIGS. 4A-4E are diagrams of a multi-touch display device configured to employ active regions to determine to which layer a received annotation is to be assigned.
Figure 4A:
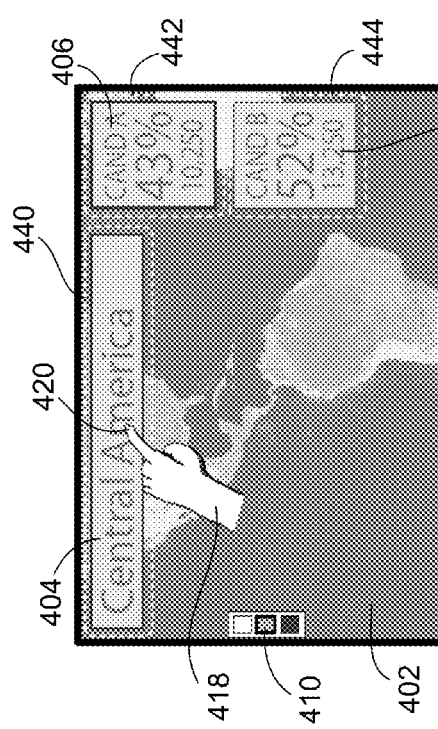

FIG. 4A illustrates the multi-touch display device 400, operating in annotation mode, maintaining active regions around a subset of the objects being displayed. As illustrated in FIG. 4A, dotted lines are used to represent active regions 440, 442, and 444 which correspond to informational window objects 404, 406, and 408, respectively, and which extend beyond the visual boundaries of the objects to which they correspond. As will be appreciated, the multi-touch display device 400 may not actually display the dotted lines.

As illustrated in FIG. 4A, finger 420 has engaged the surface of the multi-touch display device 400 within active region 440. The multi-touch display device 400 detects the position of the input and its location within active region 440, and determines that the input is to be applied to layer 414, because the active region 440 is maintained around information window 404, which is assigned to layer 414. As finger 420 is dragged across its surface, multi-touch display device 400 detects the movement of the finger, converts the input into an annotation 450, and stores and displays the annotation 450 in a manner that is visuo-spatially consistent with layer 414.

Furthermore, as illustrated in FIG. 4B, the multi-touch display device 400 temporarily extends active region 440 to encompass an area around the annotation 450 for a specified period of time. Thus, the multi-touch display device 400 allows a user to reposition the user's finger (or other input device) relative to the surface of the multi-touch display device 400 and later reengage the surface to continue providing input related to the annotation without losing the context of the annotation.

Figure 4C:
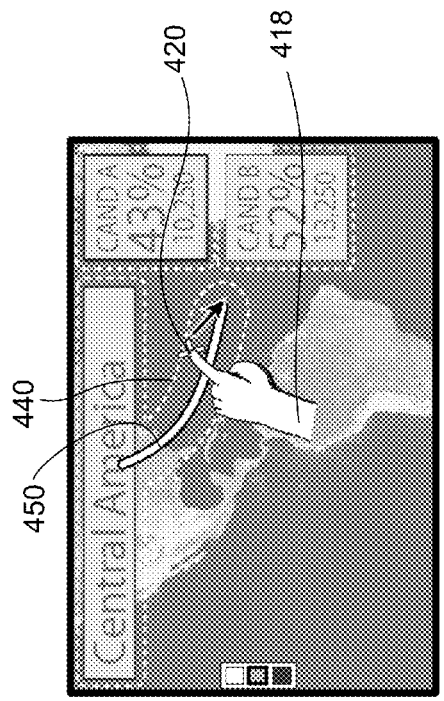
Figure 4D:
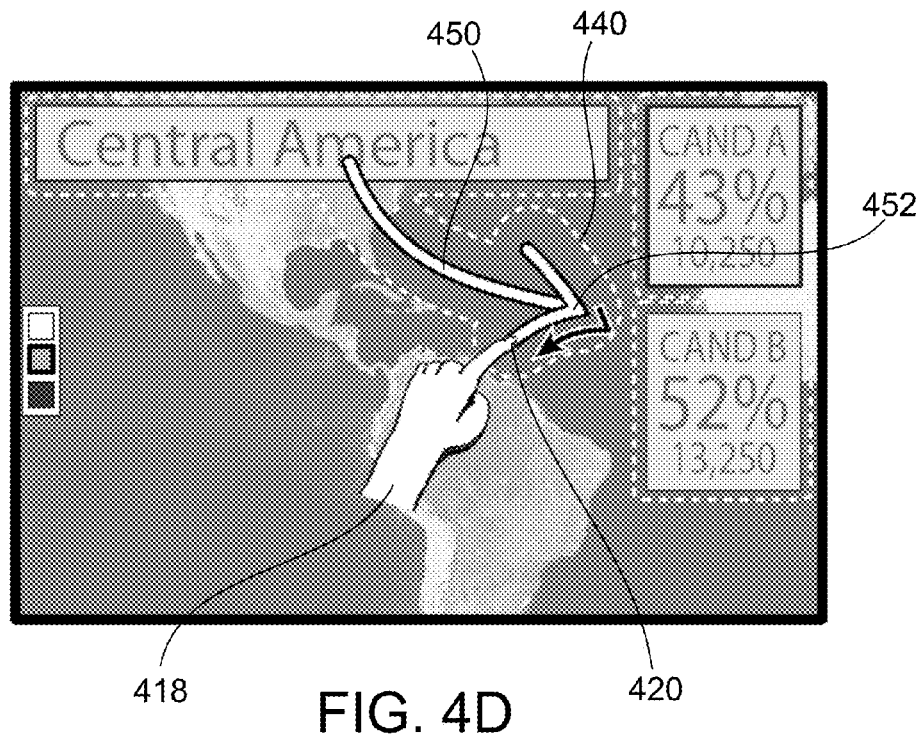
Figure 4E:
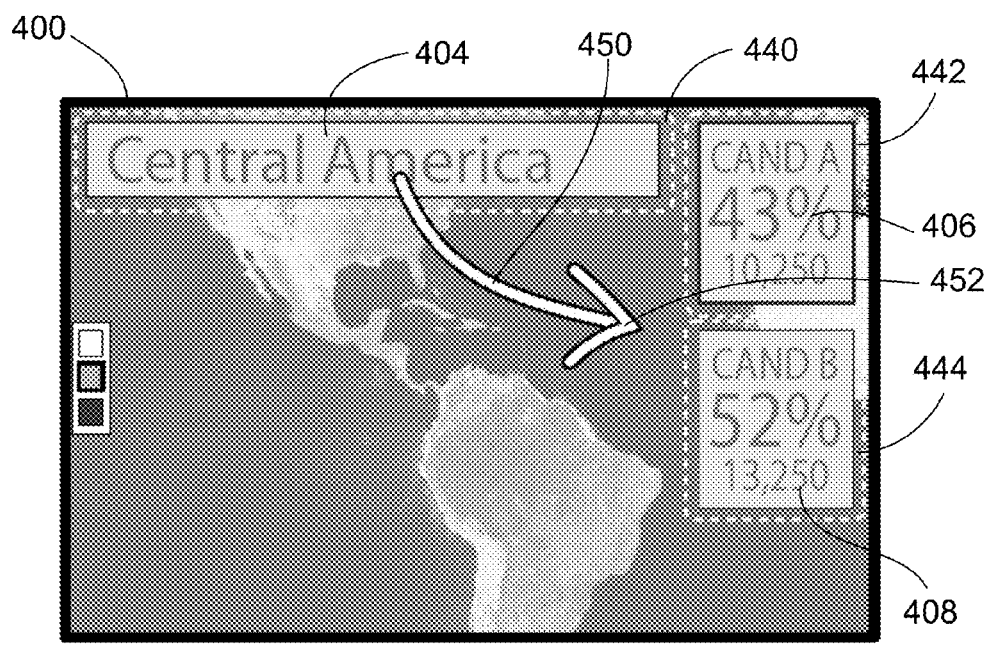

As illustrated in FIG. 4C, finger 420 engages the surface of the multi-touch display device 400 surrounding the initial annotation stroke within extended active region 440 during the temporary time period during which the multi-touch display device 400 maintains the extended active region 440. Multi-touch display device 400 detects the position of the input and its location within extended active region 440, and determines that the input is to be associated with layer 414, because the extended active region 440 corresponds to informational window object 404, which is assigned to layer 414. Therefore, referring to FIG. 4D, as the finger 420 is dragged across the screen, multi-touch display device 400 detects the movement of the finger 420, converts the input into an annotation 452, and stores and displays annotation 452 in a manner that is visuo-spatially consistent with layer 414. Thereafter, as illustrated in FIG. 4D, the multi-touch display device 400 again extends active region 440, this time to temporarily encompass an area surrounding annotation 450. As shown in FIG. 4E, however, after the specified period of time has elapsed, the multi-touch display 400 deactivates the extended active region 440 surrounding annotations 450 and 452, and the active region 440 reverts to its original size.

On the other hand, if the multi-touch display 400 was not utilizing the rule for association discussed above with regard to FIGS. 4A-4E, but rather employed the rule for association discussed above in connection with FIG. 3C, the multi-touch display device would have associated these annotations differently. Specifically, the multi-touch display device 400 would have associated annotation 450 with layer 414, because the position of the detected input responsible for annotation 450 would have fallen within the visual boundaries of object 404, which is associated with layer 414. However, the multi-touch display device 400 would have associated annotation 452 with layer 412, because the position of the detected input responsible for annotation 452 would have only fallen within the visual boundaries of object 402, which is associated with layer 412. However, such associations may have prevented a user from inputting an arrow-shaped annotation as intended.

Another example of a rule that may be employed to determine to which layer to associate a received annotation is to determine which displayed object the received annotation occupies the largest portion of and to associate the received annotation with the layer to which this object is assigned.

Notably, multi-touch display device 400 can establish active regions utilizing a number of different techniques. According to a first technique, the multi-touch display device 400 stores the active region(s) of each layer to represent an expansion of the visual boundaries of one, some or all of the objects assigned to that layer. These active regions may be established through a manual input process, in which the active region boundary is itself stored in addition to the visual boundary of the displayed object. Alternatively, the active region boundary may be established by performing a mathematical operation on the boundary of a displayed object. For instance, an absolute scalar may be applied (e.g., added) to create an active boundary region that corresponds to a uniform expansion of the boundary otherwise associated with a displayed object. Implementations of these manual processes result in active regions such as those shown in FIG. 4A, which have a border that differs from the displayed border of a corresponding displayed object.

Another manual input process involves establishing an active region boundary based on manual input from the user. For example, the active region associated with a displayed object that is being annotated may be expanded based on the annotation by including the annotation region as part of the object's active display region. Similarly, a user may indicate where the user wants the active region(s) to be created for each layer by drawing the active region(s) on the surface of the multi-touch display device 400. The multi-touch display device 400 stores this input as active region(s) for the indicated layer.

According to a second technique, multi-touch display device 400 stores the active region(s) of each layer as an expansion of the visual boundaries of one, some or all of the objects assigned to and annotations associated with that layer. Implementation of this second technique results in active regions similar to those shown in FIG. 4D, where boundaries may extend beyond the displayed object boundaries in non-uniform ways, according to the annotations applied to those objects, for instance.

According to a third technique, the multi-touch display device 400 stores the active region(s) of each layer as a rectangle or other geometric shape encompassing each object(s) assigned to the layer.

Whichever of these techniques or processes is employed, the active regions established in each of these techniques may be grown or expanded dynamically based on, for example, how frequently the active region is contacted, or the input of annotations, as discussed above in relation to FIGS. 4A-4E.

Moreover, while these techniques and processes illustrate how the boundary used for purposes of displaying an object may be disassociated from the boundary used for purposes of determining whether that same object is being manipulated, other such techniques and processes are also contemplated.

An alternative to the use of active regions, such as those illustrated in FIGS. 4A-4E, is that the multi-touch display device 400 interprets all detected inputs as encompassing an area around the position at which the input is detected. As such, the multi-touch display device 400 relates the detected input with the object associated with the highest (i.e. closest to the foreground) layer within a given radius of the position at which the input was detected, and associates the input with this highest layer.

One example of a process that may be employed by a multi-touch display device to create an annotation involves detecting movement of a user's finger (or some other input mechanism) about the surface of the multi-touch display device. In response to detecting the tracked movement of the finger, the multi-touch display device converts the tracked movement of the user's finger into an image. In some implementations, as a user has traced a path across the surface of the multi-touch display device, the multi-touch display device frequently (e.g., 30 or 60 times per second) updates the converted image to reflect the additional movement of the user's finger such that the user perceives the annotation as following the path traced by the user's finger substantially in real time. In addition, based on one or more of the rules for associating a received annotation with a corresponding layer, the multi-touch display device associates the image representing the annotation with a particular layer of the multi-touch display device (e.g., by assigning a layer ID to the image) and perhaps also a particular position within the associated layer (e.g., by assigning the image x- and y-coordinates). Furthermore, in some implementations, the multi-touch display device also may assign the image representing the annotation an order within the layer to which the image is associated (e.g., by assigning the image an order layer), thereby providing a sense of depth even within the layer.

In one implementation, a multi-touch display device, or associated hardware, maintains, for example, within a memory storage component, one or more data structures for recording relationships between objects and annotations to be displayed by the multi-touch display device. As objects and annotations are added to the display, the multi-touch display device updates the data structure(s) appropriately.

For example, referring to FIG. 3I, the multi-touch display device 300 or associated hardware may maintain a data structure that records relationships between each of the objects and annotations displayed by the multi-touch display device 300. According to one implementation, such a data structure records a layer ID, an order ID, and location information for each object and annotation. As annotations are added, the multi-touch display device 300 adds the annotations and their Layer IDs, Order IDs, and position information to the stored data structure for subsequent access. Table 1 below provides a representative example of such a data structure.

TABLE 1

| Object/Annotation ID | Layer ID | Order ID | Position Information |
|---|---|---|---|
| 302 | 312 | 0 | a, b |
| 304 | 314 | 0 | c, d |
| 306 | 314 | 0 | e, f |
| 308 | 314 | 0 | g, h |
| 310 | 316 | 0 | i, j |
| 330 | 314 | 1 | k, l |
| 332 | 314 | 2 | m, n |
| 334 | 314 | 3 | o, p |
| 336 | 312 | 1 | q, r |
| 338 | 312 | 2 | s, t |

As reflected in Table 1, the data structure records the layer ID, the order ID, as well as position information for each object and each annotation displayed by the multi-touch display device 300. The layer ID recorded for each object or annotation reflects the layer to which the corresponding object or annotation corresponds. The order ID for each object or annotation reflects the order of the object or annotation within the layer to which it corresponds. As described above, the multi-touch display device 300 may assign order IDs to annotations associated with a given layer as a function of the temporal order in which the annotations associated with the given layer were received, with recently received annotations being assigned higher order IDs than earlier received annotations. Thus, the multi-touch display device is able to provide a sense of depth to the annotations associated with any given layer that is consistent with the temporal order within which the annotations associated with that given layer were received. The data structure reflected in Table 1 also records position information for each displayed object or annotation that reveals information about the location of the object or annotation within the layer to which it corresponds.

When operating in manipulation mode, in response to detecting receipt of user input, the multi-touch display device 300 associates received input with a particular one of layers 312, 314, and 316 and, thereafter, as a function of the received input, performs a transformation operation to the particular layer including any objects or annotations corresponding to the particular layer. In order to accomplish this, the multi-touch display device 300 accesses the data structure, searches for and identifies objects and annotations corresponding to the particular layer, and, thereafter, performs the appropriate transformation operation to each so-identified object or annotation. For example, referring to FIG. 3J, as discussed above, the multi-touch display device 300 associates the input imparted by the movement of fingers 320 and 326 to 312. Thus, after associating the input with layer 312, the multi-touch display device 300 accesses the data structure and searches for all objects and annotations corresponding to layer 312. In this case, the multi-touch display device 300 determines, based on the data structure, that map object 302 and annotations 332, 336, and 338 all correspond to layer 312. Consequently, the multi-touch display device 300 applies the transformation to each of map object 312 and annotations 332, 336, and 338.

In some implementations, a multi-touch display device operating in the annotation mode is configured to concurrently receive multiple annotations to be associated with the same layer.

Figure 5A:
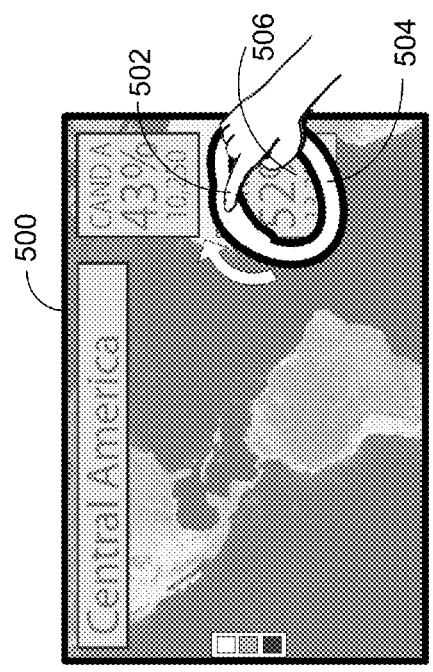
FIGS. 5A-5F are diagrams of a multi-touch display device configured to receive multiple annotations concurrently.

Referring to FIG. 5A, the multi-touch display device 500 detects the movement of finger 502 on the surface of the multi-touch display device 500 and converts the detected movement into annotation 504, which the multi-touch display device associates with the virtual layer (not shown) to which informational window object 506 is assigned based on the location of the detected movement of finger 502 on the surface of the multi-touch display device 500.

Figure 5B:
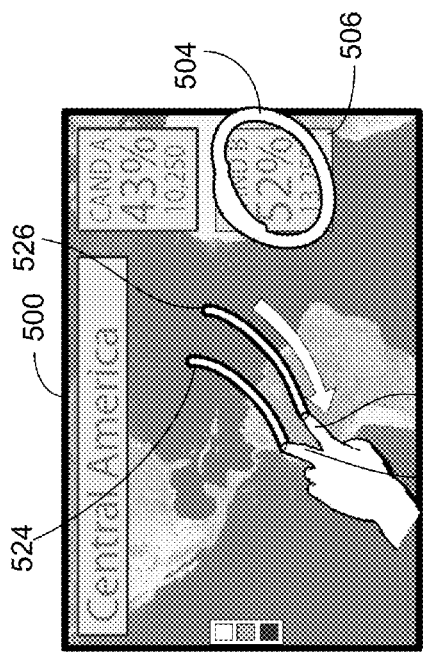

Referring to FIG. 5B, the multi-touch display device 500 detects the movement of fingers 520 and 522 and converts the detected movement of fingers 520 and 522 into annotations 524 and 526, respectively. (Although fingers 520 and 522 are illustrated as concurrently engaging the surface of the multi-touch display device 500 in FIG. 5B, fingers 520 and 522 may or may not have initially engaged the surface of the multi-touch display device 500 at the same time.) In addition, based on the location of the detected movements of fingers 520 and 522, the multi-touch display device 500 associates both annotation 524 and annotation 526 with the virtual level (not shown) to which map object 528 is assigned.

Figure 5C:
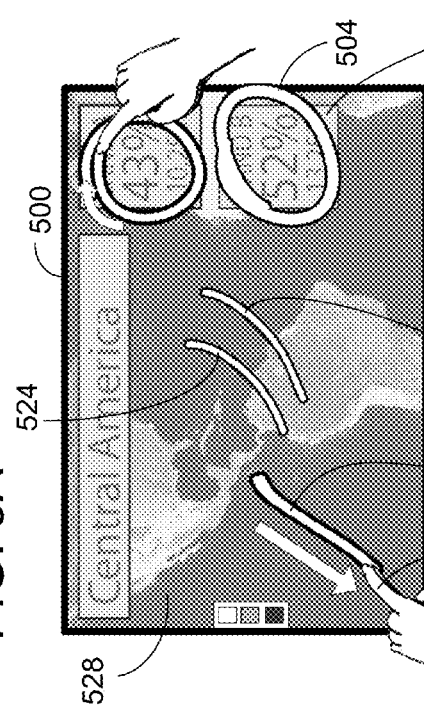
Figure 5D:
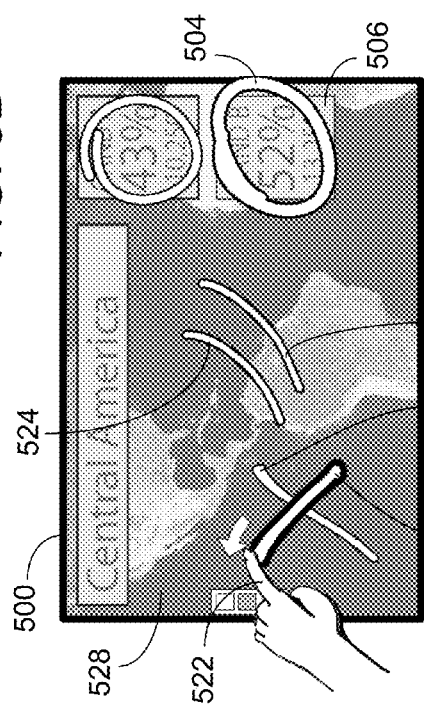

Referring to FIGS. 5C-5D, the multi-touch display device 500 detects subsequent movements of finger 522 and converts these subsequent movements into annotations 530 and 532, which the multi-touch display device 500 associates with the virtual layer (not shown) to which map object 528 is assigned based on the locations of the detected subsequent movements of finger 522.

Figure 5E:
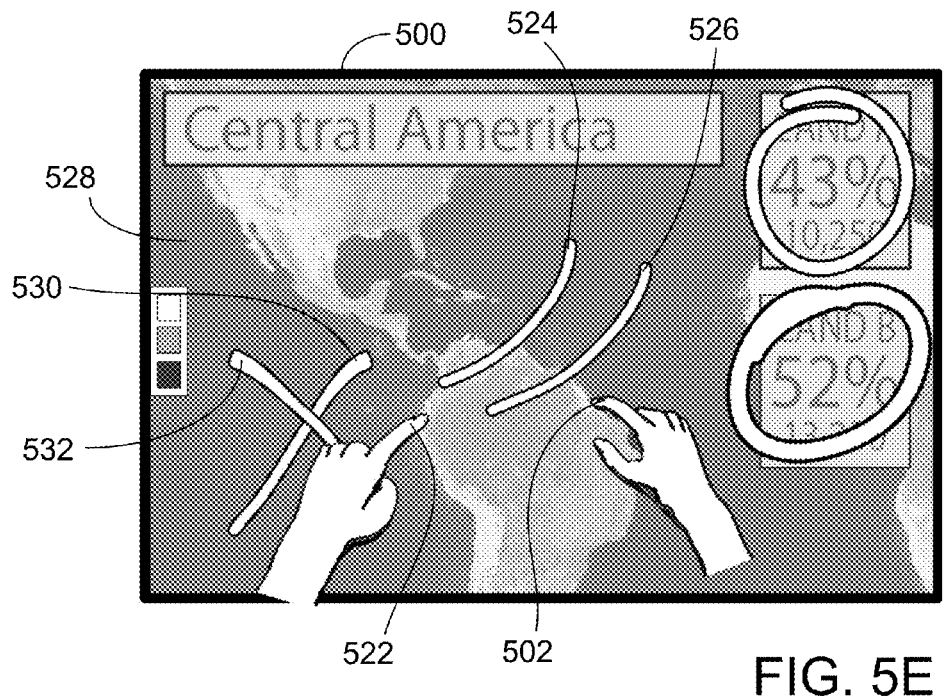
Figure 5F:
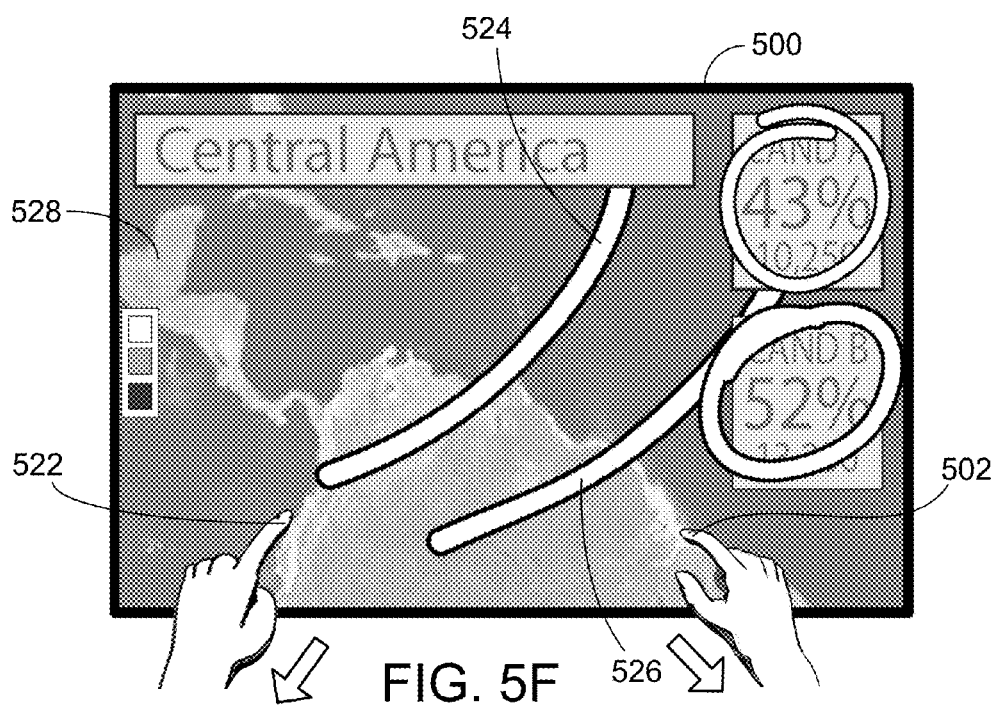

Referring to FIGS. 5E-5F, the multi-touch display device 500 is illustrated as operating in the manipulation mode. In addition, fingers 502 and 522 are engaging the surface of the multi-touch display device 500 concurrently. (Although fingers 502 and 522 are illustrated as engaging the surface of the multi-touch display device 500 concurrently, fingers 502 and 522 did not necessarily initially engage the surface of the multi-touch display device 500 at the same time.) The multi-touch display device 500 detects the movements of fingers 502 and 522 while engaged with the surface of the multi-touch display device 500. In addition, based on the location of the detected movements of fingers 502 and 522, the multi-touch display device 500 associates the received input with the virtual layer (not shown) to which map object 528 is assigned. And, because the multi-touch display device 500 is operating in the manipulation mode, the multi-touch display device 500 applies a corresponding transformation to the virtual layer to which the map object 528 is assigned. As illustrated in FIG. 5F, the annotations 524, 526, 530, and 532 and map object 528 are transformed as a result, while the other displayed annotations and objects remain unchanged.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

Multi-touch display devices encompass a wide variety of display devices and associated systems and components. Some multi-touch display devices require physical contact with a surface of the multi-touch display device in order to receive input. For example, such a multi-touch display device may receive input by detecting contact with a surface of the multi-touch display device by a finger, a stylus, some other mechanical, electro-mechanical, or magnetic input mechanism and/or any combination of multiple such input mechanisms at the same time. Furthermore, some such multi-touch display devices may be configured such that the surface that receives input may appear to be the same surface on which the multi-touch display device displays objects (whether or not the surface that receives input actually is the same surface as the surface on which the multi-touch display device displays objects). Alternatively, other such multi-touch display devices may receive input on a surface that is clearly remote and distinct from the surface on which the multi-touch display device displays objects. One example of such a multi-touch display system is a multi-point input capable standalone tablet that provides input to a remote and distinct display.

Other multi-touch display devices do not require physical contact with the surface of the multi-touch display device in order to receive input. For example, such multi-touch display devices may receive input by detecting the presence of a finger, a stylus, some other mechanical, electro-mechanical, or magnetic input mechanism and/or any combination of multiple such input mechanisms in the vicinity of the surface of the multi-touch display device even when such input mechanisms are not in physical contact with the surface of the multi-touch display device.

Furthermore, the various different transformations and annotations disclosed herein may be implemented by any other type of multi-point computing system configured to receive multiple inputs at the same, including, for example, systems configured to receive concurrent input from multiple pointing devices (e.g., multiple computer mice) and/or concurrent input from one or more pointing devices and another input device (e.g., a keyboard). Moreover, some of the various different transformations and annotations disclosed herein are not limited to implementation on a multi-touch device and thus may be implemented on a single-point device.

Various modifications may be made. For example, while scaling manipulations generally are described herein in the context of uniform scaling operations, such scaling operations need not be uniform. Furthermore, useful results still may be achieved if steps of the disclosed techniques are performed in a different order. Moreover, useful results may be achieved by combining various steps or components of the various disclosed techniques in a different manner and/or if components of the disclosed systems are combined in a different manner and/or replaced or supplemented by other components.

What is claimed is:

1. On a multi-touch display device, a computer-implemented method comprising:

defining a first visual display layer for displaying elements on a display component of a multi-touch display device, the multi-touch display device configured to detect multiple concurrent touches on the multi-touch display device;

defining a second visual display layer for displaying elements on the display component of the multi-touch display device, the second visual display layer having a different virtual depth relative to a foreground of the display component than a virtual depth of the first visual display layer such that elements assigned to the second visual display layer are displayed at the different virtual depth relative to the foreground of the display component than elements assigned to the first visual display layer;

defining a third visual display layer stacked on top of both the first and second visual display layers for displaying a control element on the display component, the control element being actuatable to toggle an operating mode of the multi-touch display between an annotation mode and a manipulation mode, the third display layer having a different virtual depth relative to both the first and second visual display layers, the third visual display layer being located at the foreground of the display component;

assigning a first object to the first visual display layer, and establishing relationships between the first object and corresponding positions on the first visual display layer to be maintained when transformations are applied to the first visual display layer;

assigning a second object to the second visual display layer, and establishing relationships between the second object and corresponding positions on the second visual display layer to be maintained when transformations are applied to the second visual display layer;

displaying, on the display component, the first object at the first visual display layer and the second object at the second visual display layer, wherein the first and second visual layers are stacked on top of one another, and wherein the second object occludes objects with which it overlaps that are assigned to the first visual display layer;

determining that an input mechanism engaged a surface of the multi-touch display device at a particular location;

determining, based on the particular location, that input received from the input mechanism while the input mechanism remains engaged with the surface of the multi-touch display device is to be assigned to the first visual display layer;

monitoring movement of the input mechanism while the input mechanism remains engaged with the surface of the multi-touch display device;

determining that the input mechanism has traced a path across the surface of the multi-touch display device;

defining an annotation having a shape that follows the determined path traced by the input mechanism;

determining that a position of the annotation is related to a position of the first object;

in response to determining that the position of the annotation is related to the position of the first object, assigning the annotation to the first visual display layer with a higher order than the first object, and establishing relationships between the annotation and corresponding positions on the first visual display layer to be maintained when transformations are applied to the first visual display layer; and displaying, on the display component, the annotation with the higher order on top of the first object at the first visual display layer.

2. The method of claim 1, wherein displaying, on the display component, the annotation at the first visual display layer includes displaying the annotation such that the annotation occludes any objects with a lower order assigned to the first visual display layer with which the annotation overlaps.

3. The method of claim 1, wherein:
the second visual display layer is defined as being closer to the foreground of the display component of the multi-touch display device than the first visual display layer; and
the second object is displayed as being closer to the foreground of the display component of the multi-touch display device than the first object.

4. The method of claim 3, wherein:
the first object occupies an entire extent of the first visual display layer; and
the first object is displayed as a background, and the second object is displayed as occluding a portion of the first object.

5. The method of claim 3, further comprising:
after assigning the annotation to the first visual display layer, receiving input from one or more input mechanisms corresponding to a request to apply a transformation to the first visual display layer;
in response to receiving the input from the one or more input mechanisms corresponding to the request to apply the transformation to the first visual display layer, applying the requested transformation to the first visual display layer independent of the second visual display layer; and
applying a corresponding transformation to the annotation and the first visual display layer that preserves the established relationships between the first visual display layer and the annotation.

6. The method of claim 5, wherein:
applying the corresponding transformation to the annotation includes transforming the annotation such that the annotation occupies a location on the first visual display layer that at least partially overlaps with a location of the second object on the second visual display layer; and
displaying, on the display component, the annotation at the first visual display layer includes displaying the annotation such that the annotation with the higher order occludes the portion of the first object with which the annotation overlaps and such that the portion of the second object on the second visual display layer that overlaps with the portion of the annotation with the higher order occludes the portion of the annotation with which the portion of the second object overlaps.

7. The method of claim 3, further comprising:
determining that another input mechanism engaged the surface of the multi-touch display device at another location;
determining, based on the other location, that input received from the other input mechanism while the other input mechanism remains engaged with the surface of the multi-touch display device is to be assigned to the second visual display layer;
monitoring movement of the other input mechanism while the other input mechanism remains engaged with the surface of the multi-touch display device;
determining that the other input mechanism has traced another path across the surface of the multi-touch display device;
defining another annotation having a shape that follows the other determined path traced by the other input mechanism across the surface of the multi-touch display device;
assigning the other annotation to the second visual display layer, and establishing relationships between the other annotation and corresponding positions on the second visual display layer to be maintained when transformations are applied to the second visual display layer;
determining that the other determined path traced by the other input mechanism across the surface of the multi-touch display device overlaps a portion of at least one of the first object and the annotation; and
displaying, on the display component, the other annotation at the second visual display layer such that the other annotation occludes the portion of the at least one of the first object and the annotation with which the other annotation overlaps.

8. The method of claim 7, wherein the input mechanism and the other input mechanism are the same input mechanism.

9. The method of claim 7, wherein the input mechanism and the other input mechanism are different input mechanisms.

10. The method of claim 1, further comprising:
storing, in a computer memory storage system, the first object including an identification of the layer to which the first object has been assigned and an indication of an order in which the first object is to be displayed with respect to other objects assigned to the same visual layer; and
storing, in the computer memory storage system, the annotation as a third object including an identification of the layer to which the annotation has been assigned and an indication of an order in which the annotation is to be displayed with respect to other objects assigned to the same visual layer.

11. The method of claim 10, wherein:
the indication of the order in which the first object is to be displayed with respect to other objects assigned to the same visual layer includes a time at which the first object is defined,
the indication of the order in which the annotation is to be displayed with respect to other objects assigned to the same visual layer includes a time at which the annotation is defined;
the time at which the first object is defined is prior to the time at which the annotation is defined; and based on the time at which the first object is defined being prior to the time at which the annotation is defined, displaying, on the display component, the annotation at the first visual display layer such that the annotation occludes any portion of the first object that the annotation overlaps.

12. The method of claim 1, wherein determining, based on the particular location, that input received from the input mechanism while the input mechanism remains engaged with the surface of the multi-touch display device is to be assigned to the first visual display layer includes:
   determining that the particular location at which the input mechanism engaged the surface of the multi-touch display device corresponds to a location at which the first object is displayed on the display component of the multi-touch display device;
   determining that the first object has been assigned to the first visual display layer; and
   determining that the input received from the input mechanism while the input mechanism remains engaged with the surface of the multi-touch display device is to be assigned to the first visual display layer.

13. The method of claim 12, further comprising:
   determining that the particular location at which the input mechanism engaged the surface of the multi-touch display device also corresponds to a location at which the second object is displayed on the display component of the multi-touch display device; and
   determining that the second object has been assigned to the second visual display layer,
   wherein determining that the input received from the input mechanism while the input mechanism remains engaged with the surface of the multi-touch display device is to be assigned to the first visual display layer includes:
      determining that the first visual display layer is defined as being closer to the foreground of the display component of the multi-touch display device than the second visual display layer; and
      determining that the input received from the input mechanism while the input mechanism remains engaged with the surface of the multi-touch display device is to be assigned to the first visual display layer.

14. The method of claim 1, wherein determining, based on the particular location at which the input mechanism engaged the surface of the multi-touch display device, that the input received from the input mechanism while the input mechanism remains engaged with the surface of the multi-touch display device is to be assigned to the first visual display layer includes:
   determining that the particular location at which the input mechanism engaged the surface of the multi-touch display device corresponds to a particular distance from a location at which the first object is displayed on the display component of the multi-touch display device;
   determining that the first object has been assigned to the first visual display layer; and
   determining that the input received from the input mechanism while the input mechanism remains engaged with the surface of the multi-touch display device is to be assigned to the first visual display layer.

15. The method of claim 1, wherein determining that the input mechanism has traced the path across the surface of the multi-touch display device includes:
   determining that the traced path includes points external to boundaries of the first object; and
   maintaining the assignment of the input received from the input mechanism while the input mechanism remains engaged with the surface of the multi-touch display device to the first visual display layer.

16. The method of claim 1, wherein defining the annotation includes defining the annotation after the input mechanism has disengaged the surface of the multi-touch display device.

17. The method of claim 1, further comprising defining a first active region that includes the first object and extends beyond the visual boundaries of the first object, wherein determining, based on the particular location, that the input received from the input mechanism while the input mechanism remains engaged with the surface of the multi-touch display device is to be assigned to the first visual display layer includes:
   determining that the particular location at which the input mechanism engaged the surface of the multi-touch display device corresponds to a point within the defined first active region;
   determining that the first object has been assigned to the first visual display layer; and
   determining that the input received from the input mechanism while the input mechanism remains engaged with the surface of the multi-touch display device is to be assigned to the first visual display layer.

18. The method of claim 17, further comprising:
   after displaying the annotation at the first visual display layer, defining, for a predetermined period of time, a second active region to include the annotation and to extend beyond the visual boundaries of the annotation;
   determining, within the predetermined period of time, that the input mechanism re-engaged the surface of the multi-touch display device at another location;
   determining that the other location at which the input mechanism re-engaged the surface of the multi-touch display device corresponds to a point within the second active region;
   determining that input received from the input mechanism while the input mechanism remains re-engaged with the surface of the multi-touch display device is to be assigned to the first visual display layer;
   monitoring movement of the input mechanism while the input mechanism remains re-engaged with the surface of the multi-touch display device;
   determining that the input mechanism has traced another path across the surface of the multi-touch display device;
   redefining the annotation having a shape that is based on both the determined path and the other determined path traced by the input mechanism across the surface of the multi-touch display device;
   assigning the redefined annotation to the first visual display layer with a further higher order than the annotation with the higher order than the first object, and establishing relationships between the redefined annotation and corresponding positions on the first visual display layer to be maintained when transformations are applied to the first visual display layer; and
   displaying, on the display component, the redefined annotation with the further higher order on top of the annotation and the first object at the first visual display layer.

19. The method of claim 17, further comprising:
   redefining, for a predetermined period of time, the first active region to include the first object and the annotation and to extend beyond the visual boundaries of the first object and the annotation;

determining that the input mechanism disengages the surface of the multi-touch display device;

after determining that the input mechanism disengages the surface of the multi-touch display device, determining that the input mechanism re-engaged the surface of the multi-touch display device at another location;

determining that the other location at which the input mechanism re-engaged the surface of the multi-touch display device corresponds to a point within the redefined first active region;

determining that input received from the input mechanism while the input mechanism remains re-engaged with the surface of the multi-touch display device is to be assigned to the first visual display layer;

monitoring movement of the input mechanism while the input mechanism remains re-engaged with the surface of the multi-touch display device;

determining that the input mechanism has traced another path across the surface of the multi-touch display device;

defining another annotation having a shape that is based on the other determined path traced by the input mechanism across the surface of the multi-touch display device;

assigning the other annotation to the first visual display layer and establishing relationships between the other annotation and corresponding positions on the first visual display layer to be maintained when transformations are applied to the first visual display layer; and displaying, on the display component, the other annotation at the first visual display layer.

20. The method of claim 19, wherein redefining the first active region includes redefining the first active region after having determined that the input mechanism has traced the path across the surface of the multi-touch display device.

21. The method of claim 19, further comprising:

after displaying, on the display component, the other annotation at the first visual display layer, determining that the input mechanism again disengaged the surface of the multi-touch display device;

determining that the predetermined period of time for which the first active region is redefined has elapsed; and reestablishing the previous definition of the first active region such that the first active region only includes the first object and only extends beyond the visual boundaries of the first object.

22. The method of claim 1 wherein the display component creates a perception that elements assigned to the second visual display layer are displayed at the different virtual depth relative to the foreground of the display component of the multi-touch display device than elements assigned to the first visual display layer by occluding any objects assigned to whichever of the first visual display layer and the second visual display layer that exists at a virtual depth further from the foreground of the display component that overlap any objects assigned to whichever of the first visual display layer and the second visual display layer that exists at a virtual depth closer to the foreground of the display component of the multi-touch display device.

23. The method of claim 1, wherein the established relationships include only a relationship between the first object and the first visual display layer.

24. The method of claim 1, wherein the transformations are independent of the first object but for their application to the first visual display layer with which the first object is associated.

25. The method of claim 1 wherein:

determining that the input mechanism engaged the surface of the multi-touch display device at the particular location includes determining that the input device is making physical contact with the surface of the multi-touch display device at the particular location; and monitoring movement of the input mechanism while the input mechanism remains engaged with the surface of the multi-touch display device includes monitoring movement of the input mechanism while the input mechanism continues to make physical contact with the surface of the multi-touch display device at the particular location.

26. The method of claim 1 wherein:

determining that the input mechanism engaged the surface of the multi-touch display device at the particular location includes determining that the input device, without making contact with the surface of the multi-touch display device, is hovering in a vicinity of the particular location on the display component; and monitoring movement of the input mechanism while the input mechanism remains engaged with the surface of the multi-touch display device includes monitoring movement of the input mechanism while the input mechanism, without making contact with the surface of the multi-touch display device, is hovering in the vicinity of the display component.

27. A multi-touch display device including a processor configured to:

define a first visual display layer for displaying elements on a display component of the multi-touch display device;

define a second visual display layer stacked on top of the first visual display layer for displaying elements on the display component, the second visual display layer having a different virtual depth relative to a foreground of the display component than a virtual depth of the first visual display layer;

define a third visual display layer stacked on top of both the first and second visual display layers for displaying a control element on the display component, the control element being actuatable to toggle an operating mode of the multi-touch display between an annotation mode and a manipulation mode, the third display layer having a different virtual depth relative to both the first and second visual display layers, the third visual display layer being located at the foreground of the display component;

in the annotation mode, assign a first object to the first visual display layer and establish relationships between the first object and corresponding positions on the first visual display layer to be maintained when transformations are applied to the first visual display layer in the manipulation mode;

in the annotation mode, assign a second object to the second visual display layer and establish relationships between the second object and corresponding positions on the second visual display layer to be maintained when transformations are applied to the second visual display layer in the manipulation mode;

display, on the display component, the first object at the first visual display layer, the second object at the second visual display layer, and the control element at the third visual display layer, wherein the first, second, and third visual display layers are stacked on top of one another, and wherein the second object and control element at least partially occlude objects overlapped and assigned to visual display layers falling therebelow;

determine that a first input mechanism engaged a surface of the multi-touch display device at a first location while a second input mechanism concurrently engaged the surface of the multi-touch display device at a second location;

determine, based on the first location, that input received from the first input mechanism while the first input mechanism remains engaged with the surface of the multi-touch display device is to be assigned to the first visual display layer;

determine, based on the second location, that input received from the second input mechanism while the second input mechanism remains engaged with the surface of the multi-touch display device is to be assigned to the second visual display layer;

monitor movement of the first input mechanism while the first input mechanism remains engaged with the surface of the multi-touch display device;

monitor movement of the second input mechanism while the second input mechanism remains engaged with the surface of the multi-touch display device;

determine that the first input mechanism has traced a first path across the surface of the multi-touch display device;

determine that the second input mechanism has traced a second path across the surface of the multi-touch display device;

define a first annotation having a shape that follows the first determined path traced by the first input mechanism;

define a second annotation having a shape that follows the second determined path traced by the second input mechanism;

assign the first annotation to the first visual display layer with an order higher than the first object, and establish relationships between the first annotation and corresponding positions on the first visual display layer to be maintained when transformations are applied to the first visual display layer in the manipulation mode;

assign the second annotation to the second visual display layer with an order higher than the second object, and establish relationships between the second annotation and corresponding positions on the second visual display layer to be maintained when transformations are applied to the second visual display layer in the manipulation mode; and concurrently display, on the display component, the first annotation on top of the first object at the first visual display layer and the second annotation on top of the second object at the second visual display layer.

28. The multi-touch display device of claim 27, further configured to:
determine that the second path traced across the surface of the multi-touch display device by the second input mechanism overlaps the first path traced across the surface of the multi-touch display device by the first input mechanism,
wherein concurrent display, on the display component, of the first annotation at the first visual display layer and the second annotation at the second visual display layer includes display of the second annotation such that the second annotation overlaps the first annotation.

29. The multi-touch display device of claim 27, further configured to:
toggle the operating mode to the manipulation mode by actuating the control element of the third visual display layer;
receive input from one or more input mechanisms corresponding to a first request to apply a transformation to the first visual display layer;
apply the requested transformation to only the first visual display layer such that the requested transformation does not affect the second visual display layer; and
apply a corresponding transformation to the first annotation and the established relationships between the first visual display layer and the first annotation, the corresponding transformation not being applied to the second annotation as a result of the requested transformation not affecting the second visual display layer.

30. On a multi-touch display device, a computer-implemented method comprising:
defining a data structure for recording relationships between objects and annotations to be displayed by the multi-touch display device;
defining a first visual display layer and first layer ID for displaying elements on a display component of a multi-touch display device, where a layer ID reflects the layer to which an object corresponds;
defining a second visual display layer and second layer ID for displaying elements on the display component, the second visual display layer having a different virtual depth relative to a foreground of the display component of the multi-touch display device than a virtual depth of the first visual display layer;
assigning a first order ID to a first object, and assigning the first object to the first visual display layer, and establishing relationships between the first object and corresponding positions on the first visual display layer to be maintained when transformations are applied to the first visual display layer, where an order ID reflects the order within the layer to which the object corresponds;
assigning a second order ID to a second object, and assigning the second object to the second visual display layer, and establishing relationships between the second object and corresponding positions on the second visual display layer to be maintained when transformations are applied to the second visual display layer;
displaying, on the display component, the first object at the first visual display layer based on the first order ID and first layer ID, and the second object at the second visual display layer based on the second order ID and second layer ID, wherein the first and second visual layers are stacked on top of one another based on the layer ID, the second layer ID being greater than the first layer ID, and wherein the second object occludes objects with which it overlaps that are assigned to the first visual display layer;
determining that a touch input mechanism engaged a surface of the multi-touch display device at a particular location;
monitoring movement of the touch input mechanism while the touch input mechanism remains engaged with the surface of the multi-touch display device;
determining that the touch input mechanism has traced a path across the surface of the multi-touch display device;

defining an annotation having a shape that follows the determined path traced by the touch input mechanism across the surface of the multi-touch display device;

displaying, on the display component, the annotation at the first visual display layer;

determining, based on the determined path traced by the input mechanism across the surface of the multi-touch display device, that input received from the touch input mechanism while the touch input mechanism remains engaged with the surface of the multi-touch display device is to be assigned to the first visual display layer; and assigning the annotation to the first visual display layer with a higher order ID than the first order ID, and establishing relationships between the annotation and corresponding positions on the first visual display layer to be maintained when transformations are applied to the first visual display layer.

31. The method of claim 30, wherein determining that the input received from the touch input mechanism while the touch input mechanism remains engaged with the surface of the multi-touch display device is to be assigned to the first visual display layer includes:

determining that the path traced by the touch input mechanism across the surface of the multi-touch display device overlaps the first object more than any other object displayed on the display component;

determining based on the first layer ID that the first object has been assigned to the first visual display layer; and determining that the input received from the touch input mechanism while the touch input mechanism remains engaged with the surface of the multi-touch display device is to be assigned to the first visual display layer.

* * * * *